(No Model.) 2 Sheets—Sheet 1.
H. C. REED.
TROLLEY GUARD.
No. 590,166. Patented Sept. 14, 1897.
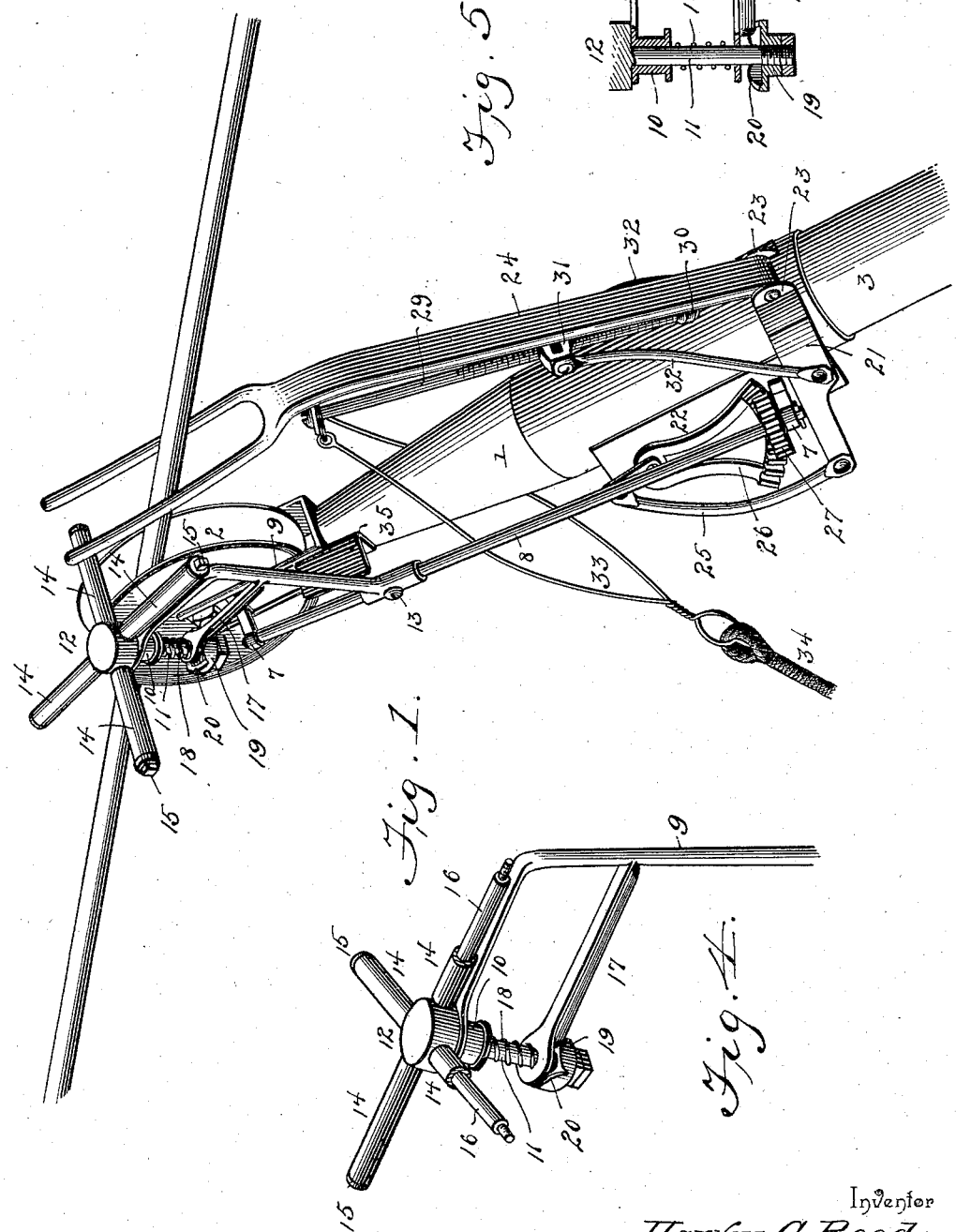
Witnesses
E. S. Monroe
V. B. Hillyard.
Inventor
Harvey C. Reed,
By his Attorneys,
C. A. Snow & Co.

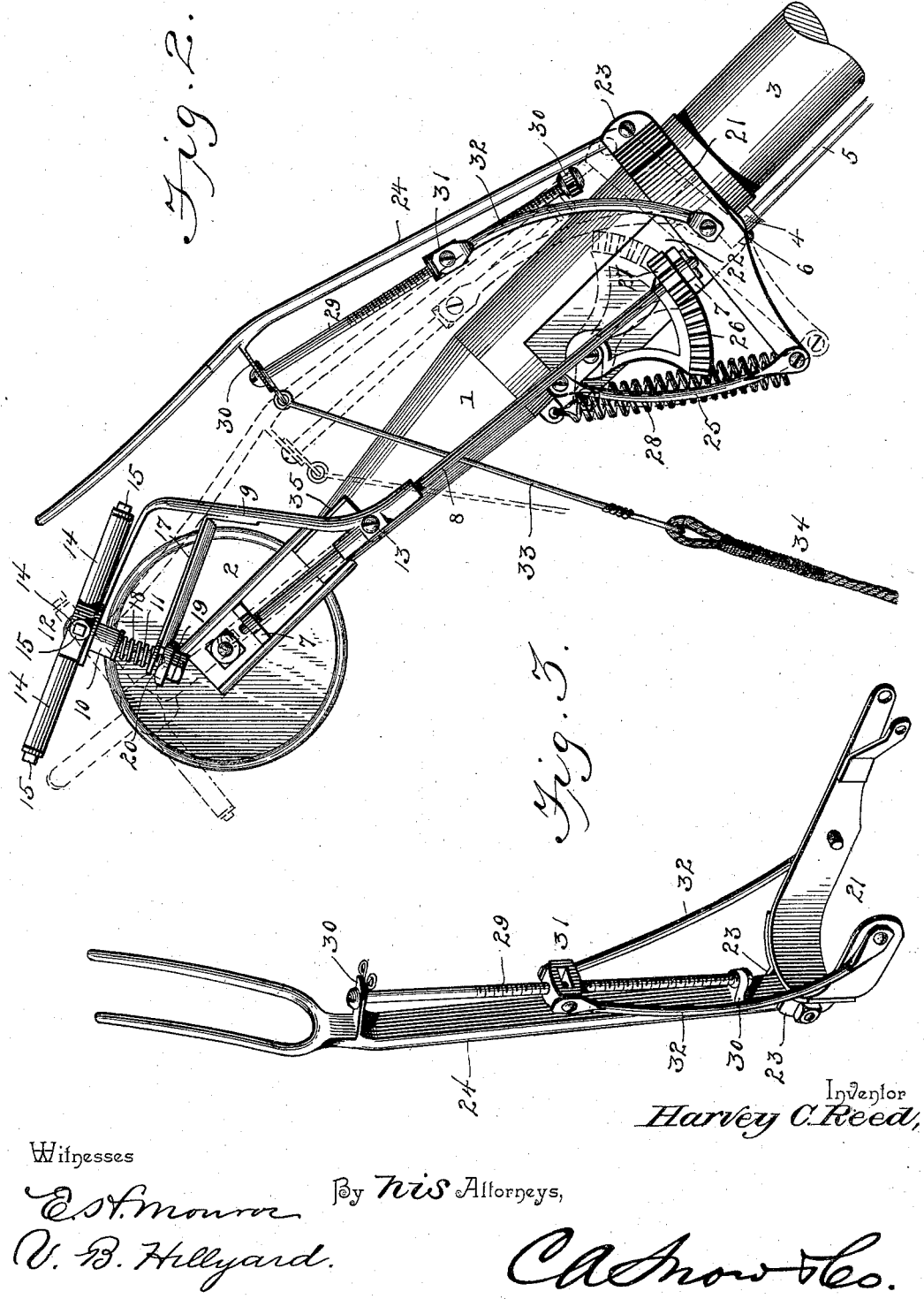

UNITED STATES PATENT OFFICE.

HARVEY C. REED, OF MINNEAPOLIS, MINNESOTA.

TROLLEY-GUARD.

SPECIFICATION forming part of Letters Patent No. 590,166, dated September 14, 1897.

Application filed March 16, 1897. Serial No. 627,788. (No model.)

*To all whom it may concern:*

Be it known that I, HARVEY C. REED, a citizen of the United States, residing at Minneapolis, in the county of Hennepin and State of Minnesota, have invented a new and useful Trolley-Guard, of which the following is a specification.

This invention relates to that class of devices particularly designed for preventing the trolley of an electrically-operated line leaving the overhead conductor, and provides a means for successfully attaining this end as the line-wire is retained in the trolley by a portion of a holder extending thereover at all times except when passing switches, crosslines, and other parts branching laterally from the conductor.

In its simplest form the invention consists of a wheel having a series of arms disposed so that one of the said arms extends across the trolley to prevent it accidentally leaving the line-wire, said wheel being mounted so as to turn to admit of the active arm passing by a support and bringing another arm in position for active service.

The improvement also consists in combining with the said wheel or retainer means for holding it against rotation except when the arms engage with the line-supports, thereby preventing the useless rotation of the retainer.

The improvement further consists in combining with the retainer a guard which operates in advance thereof to throw the retainer to one side when passing a crossing, switch, or other part intersecting with or branching laterally from the line, thereby preventing injury to the retainer and trolley. The pull cord or rope has connection with this guard, so that upon drawing thereon to lower the trolley the first action is to operate the guard, which results in throwing the retainer to one side, and a continued pull upon the rope lowers the trolley in the ordinary manner.

The improvement also consists in the novel mechanism interposed between the shaft carrying the retainer and the guard, whereby the said shaft is positively actuated in each direction to throw the retainer into and out of an operative position, as required.

For a full understanding of the merits and advantages of the invention, reference is to be had to the accompanying drawings and the following description.

The improvement is susceptible of various changes in the form, proportion, and the minor details of construction without departing from the principle or sacrificing any of the advantages thereof, and to a full disclosure of the invention an adaptation thereof is shown in the accompanying drawings, in which—

Figure 1 is a perspective view of a trolley having the invention applied thereto, the parts appearing in operative relation. Fig. 2 is a side elevation, the full lines showing the relation of the parts under normal conditions and the dotted lines showing the guard depressed and the retainer turned aside. Fig. 3 is a detail view in perspective of the guard, the lever to which the guard is pivoted, and the means for relatively adjusting the guard and lever. Fig. 4 is a detail view showing more clearly the mountings and the means for normally holding the retainer against rotation and admitting of its turning when the arm extending across the trolley engages with a line-support. Fig. 5 is a sectional detail of the axle of the retainer and its mountings.

Corresponding and like parts are referred to in the following description and indicated in the several views of the accompanying drawings by the same reference-characters.

The metal end or head 1, forked at its upper end and bearing the trolley 2, is secured to the end of a pole 3 in any manner desired, and is provided with a socket 4 to receive the terminal end of the wire 5, by means of which the current is conveyed to the motor of the car or other vehicle, said wire being secured in the socket by a binding-screw 6 in the usual way. Brackets 7 are applied to a side of the head 1 and form bearings for a shaft 8, which carries the retainer or wheel for holding the line-wire in engagement with the trolley. A bracket 9 forms part of or is applied to the shaft 8 and has a bearing 10 at its free end, in which is journaled the axle 11 of the retainer-wheel 12. In order to facilitate the assembling of the parts and provide for relatively adjusting the retainer and trolley, the bracket 9 is movable upon the shaft 8 and is secured in an adjusted position by a binding-screw 13, which operates in a threaded opening formed in the sleeve at the inner end of the bracket and through which the shaft 8 passes.

The retainer 12 is in the form of a rimless wheel the projecting spokes or arms of which are had in sufficient number so that one arm will extend across the trolley at all times and retain the line-wire therein. Usually four arms have been found sufficient, but this number may be increased or diminished, as required, so long as the desired end is attained. In order to reduce the friction between the arms and the line-wire when the two are in engagement, sleeves or rollers 14 are mounted thereon and are retained in place by nuts 15 or equivalent fastenings applied to the outer ends of the arms 16. The outer end of the bracket 9 is expanded to present an extended bearing-surface for the hub portion of the retainer to engage with, and in order to give stability to the parts the bracket 9 has an arm 17 applied thereto and which is formed at its outer end with a bearing to receive the axle 11. The arm 17 and the outer portion of the bracket 9 are relatively movable by a spring action, so as to admit of the axle 11 moving longitudinally with reference to the arm 17, for a purpose presently to be explained. A spring 18 is mounted upon the axle 11 and is interposed between the outer ends of the arm 17 and bracket 9 to supplement their spring action and hold these parts separated. A disk 19 is secured to the inner or lower end of the axle 11 and is formed on its upper side with a series of cam portions 20, which ride upon the arm 17 and retain the wheel 12 in such position, so that an arm thereof extends over the trolley and the said wheel is prevented from rotation except when the arm extending thereover engages with a support of the line-wire. The cam portions 20 engage with the arm 17 with such a force as to resist the turning of the retainer except by engagement of an arm 16 with a line-support or other unyielding projection, when the retainer will turn to permit the arm to pass by the obstruction and bring another arm in active position. The cam portions correspond in number with the arms 16 and are disposed with reference to the arm 17, so as to hold the arms 16 about at right angles to the plane of the trolley. The cam portions 20 are double faced, so as to admit of the retainer turning in either direction when the trolley is operating on the line without reversing its position.

A lever 21 has an end portion recurved and fulcrumed to wings or plates 22, applied to the opposite sides of the head 1 near its lower end, and the upper or front portion of this lever has ears 23, between which is pivoted the lower end of the guard 24, the latter consisting of a bar having its upper end forked to receive the line-wire. A link 25 connects the lower or rear end of the lever 21 with a toothed segment 26, pivoted to the wing 22, adjacent to the shaft 8, whereby the said segment and lever move together. The toothed segment 26 intermeshes with a pinion 27, secured to the lower end of the shaft 8, whereby the lever, segment, and shaft, and the parts applied thereto, move simultaneously to attain the end to be explained more fully hereinafter. A spring 28 is interposed between the rear end of the lever 21 and the head 1 and holds the parts in a normal position.

A threaded rod 29 is journaled at its ends in bearing-lugs 30, projecting from the inner or lower side of the guard 24, and has a nut 31 mounted thereon. Braces 32 have pivotal connection at their ends with the nut 31 and the lever 21 and fix the position of the guard 24 with reference to the lever 21. By turning the threaded rod 29 in its bearings the nut 31 will be moved longitudinally thereon, thereby varying the relative angle between the lever 21 and guard 24, so as to throw the forked end of the latter a greater or less distance from the trolley, as desired. A wire loop 33 has connection with the upper portion of the guard, and the pull rope, cord, or wire 34 has connection therewith.

When the parts are properly assembled, the toothed segment 26 and pinion 27 intermesh, the retainer occupies a position so that an arm extends over the trolley, a stop 35 fixing the position thereof, and the guard extends in front of the trolley and retainer a sufficient distance so that when depressed it will not interfere with the turning aside of the retainer to admit of the latter passing by a crossing, switch, or other obstructing part, or to permit the trolley to be disconnected from the line-wire when pulling upon the cord 34. When the outer end of the guard is moved toward the trolley by engaging with a crossing, switch, or other projecting part, or when drawing upon the rope or part 34, the lever 21 is turned and actuates the toothed segment, which, intermeshing with the pinion 27, turns the shaft 8 and throws the retainer to one side and out of the path of the line-wire, as indicated by the dotted lines in Fig. 2 and as will be readily understood from the foregoing description, thereby permitting the trolley to pass by the crossing or obstructing part or to be lowered. When the guard is released from the action of the force moving it from a normal position, the spring 28, previously extended, will regain itself and return the parts to a normal position.

Having thus described the invention, what is claimed as new, is—

1. The combination with a trolley, of a retainer rotatably mounted and having projecting parts or arms to extend across the trolley and retain the line-wire in engagement therewith, and adapted to turn to clear a line-support or like part, substantially as set forth.

2. The combination with a trolley, of a retainer having a series of arms and mounted to turn and have an arm projecting across the trolley, and sleeves or rollers mounted upon the arms, substantially as set forth.

3. The combination with a trolley, of a retainer rotatably mounted and having projecting parts or arms to extend across the trolley, and means for securing the retainer against rotation except when an arm or part thereof engages with a line-support, substantially as set forth.

4. The combination with a trolley, of a retainer rotatably mounted and having arms or projecting parts to extend across the path of the trolley, a spring-actuated part, and cam portions coöperating therewith to secure the retainer against rotation except by positive engagement of an arm or projecting part thereof with a line-support, substantially as set forth.

5. The combination with a trolley, of a rotatable retainer for holding the line-wire in place, a disk or plate having cam portions, and a spring-actuated arm coöperating with the said cam portions to hold the retainer from turning, substantially in the manner and for the purpose specified.

6. The combination with a trolley, of a rotatable retainer having arms or projecting parts to extend over the trolley, a disk secured to the axle of the retainer and having a plurality of cam portions, and a spring-actuated arm to coöperate with the said cam portions to normally hold the retainer against rotation, substantially as set forth for the purpose described.

7. The combination with a trolley, of a retainer comprising arms or projecting parts and having an axle, an arm having the said axle journaled thereto, a disk having cam portions to coöperate with the said arm to secure the retainer against rotation, and a spring for holding the said arm and disk in coöperative relation, substantially as specified.

8. The combination with a trolley, of a bracket, an arm having connection with the bracket, the outer portions of the bracket and arm normally tending to move apart by a spring action, a retainer having parts to extend over the trolley and provided with an axle journaled in the outer ends of the bracket and arm, and a disk secured to the axle of the retainer and having cam portions to coöperate with one of the supports to secure the retainer against rotation, substantially as specified.

9. In combination, a trolley, a shaft bearing a retainer to normally extend across the trolley, a guard, an actuating mechanism between the guard and shaft to turn the retainer aside upon depressing the guard, substantially in the manner set forth for the purpose specified.

10. In combination, a trolley, a shaft, a retainer having adjustable connection with the shaft and normally extending across the trolley, a guard, and actuating mechanism between the guard and shaft to turn the retainer aside upon depressing the guard, substantially as set forth.

11. In combination, a trolley, a shaft bearing a retainer for securing the line-wire to the trolley, a guard, and means substantially as set forth for transmitting motion from the guard to the shaft to turn the retainer aside upon depressing the guard, substantially as set forth.

12. In combination, a trolley, a shaft bearing a retainer, a pinion secured to the shaft, a toothed segment intermeshing with the pinion, and a guard for actuating the toothed segment and turning the retainer aside upon depressing the guard, substantially as set forth.

13. In combination, a trolley, a shaft bearing a retainer, a pinion secured to the shaft, a toothed segment intermeshing with the pinion, a lever having connection with the toothed segment, and a guard supported by the lever and adapted to actuate the said shaft and turn the retainer aside upon being depressed, substantially as set forth.

14. In combination, a trolley, a shaft bearing a retainer, a toothed segment, a pinion secured to the shaft and intermeshing with the segment, a lever, a link connecting the lever with the toothed segment, and a guard having connection with the lever for operating it upon being depressed for turning the retainer aside, substantially as set forth.

15. In combination, a trolley, a shaft bearing a retainer, a spring for normally holding the retainer in an operative position, and a guard operatively connected with the shaft for turning it and throwing the retainer to one side upon being depressed, the guard and retainer being returned to a normal position by the aforesaid spring, substantially as set forth.

16. In combination, a trolley, a lever, a guard having loose connection with the lever, braces interposed between the guard and lever, and means for relatively adjusting the braces for changing the position of the guard with reference to the trolley and lever, substantially as set forth.

17. In a trolley, the combination of a lever, a guard, and means interposed between and having direct connection with the lever and guard for relatively adjusting them to each other and to the trolley, said means consisting of a threaded rod, a nut mounted upon the said rod and braces having loose connection with the said nut, substantially as set forth.

18. In a trolley, the combination of a lever fulcrumed intermediate of its ends to the trolley-support, a spring connecting one end of the lever with the said support, a guard having pivotal connection with the opposite end of the lever, a threaded rod journaled in bearings provided on the guard, a nut mounted upon the threaded rod, and braces interposed between the lever and nut for changing the position of the guard with relation to the lever and trolley, substantially as set forth.

19. In combination, a trolley, a shaft bearing a retainer, a lever, a toothed segment having connection with the lever, a pinion secured to the shaft and intermeshing with the segment, a guard supported by the said lever, a spring for normally maintaining the guard and retainer in operative position, and a wire loop having connection with the guard and adapted to have the pull cord or line applied thereto, substantially in the manner and for the purpose specified.

20. In combination, a trolley, a shaft, a bracket having adjustable connection with the shaft, a retainer journaled to the bracket and comprising a series of arms to extend across the trolley, means for securing the retainer against rotation except by positive engagement thereof with a line-support or like obstructing part, a lever, a toothed segment having connection with the lever, a pinion secured to the shaft and intermeshing with the segment, a guard supported by the said lever and adapted to have the pull-cord applied thereto, and a spring for normally maintaining the retainer and guard in working position and returning these parts to a normal position when released after being operated, substantially as set forth.

In testimony that I claim the foregoing as my own I have hereto affixed my signature in the presence of two witnesses.

HARVEY C. REED.

Witnesses:
 DANIEL W. CROOKER,
 J. M. DUNN.